Nov. 17, 1959

E. S. GILCHRIST ET AL 2,913,672

ELECTROMECHANICAL BALANCE UNIT

Filed Oct. 17, 1956

INVENTORS
EDGAR S. GILCHRIST AND
ARTHUR J. SABLE

BY

ATTORNEYS

Nov. 17, 1959　　　E. S. GILCHRIST ET AL　　　2,913,672
ELECTROMECHANICAL BALANCE UNIT
Filed Oct. 17, 1956　　　　　　　　　　　　　　　　4 Sheets-Sheet 2
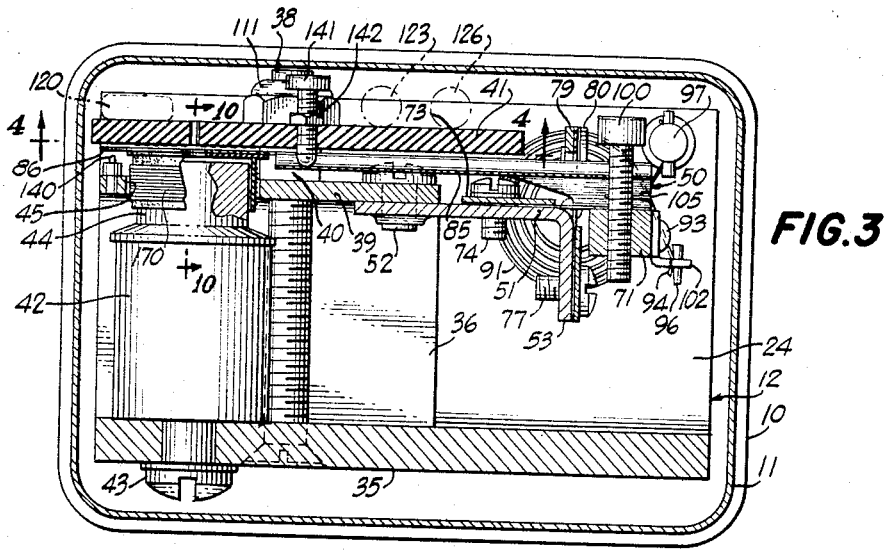
FIG. 3
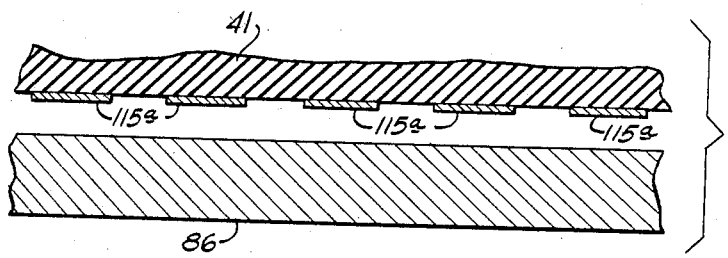
FIG. 7
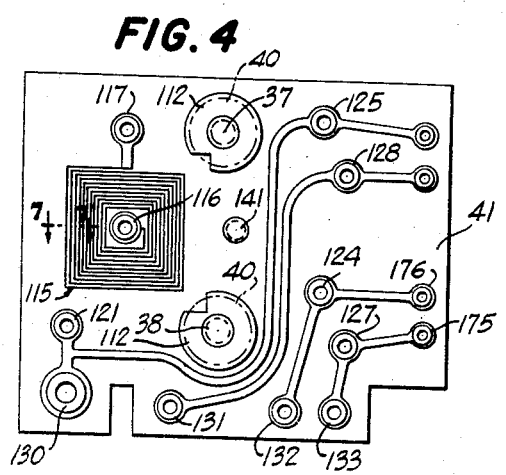
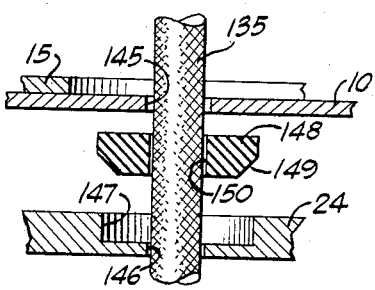
FIG. 8
INVENTORS
EDGAR S. GILCHRIST AND
ARTHUR J. SABLE
BY
ATTORNEYS

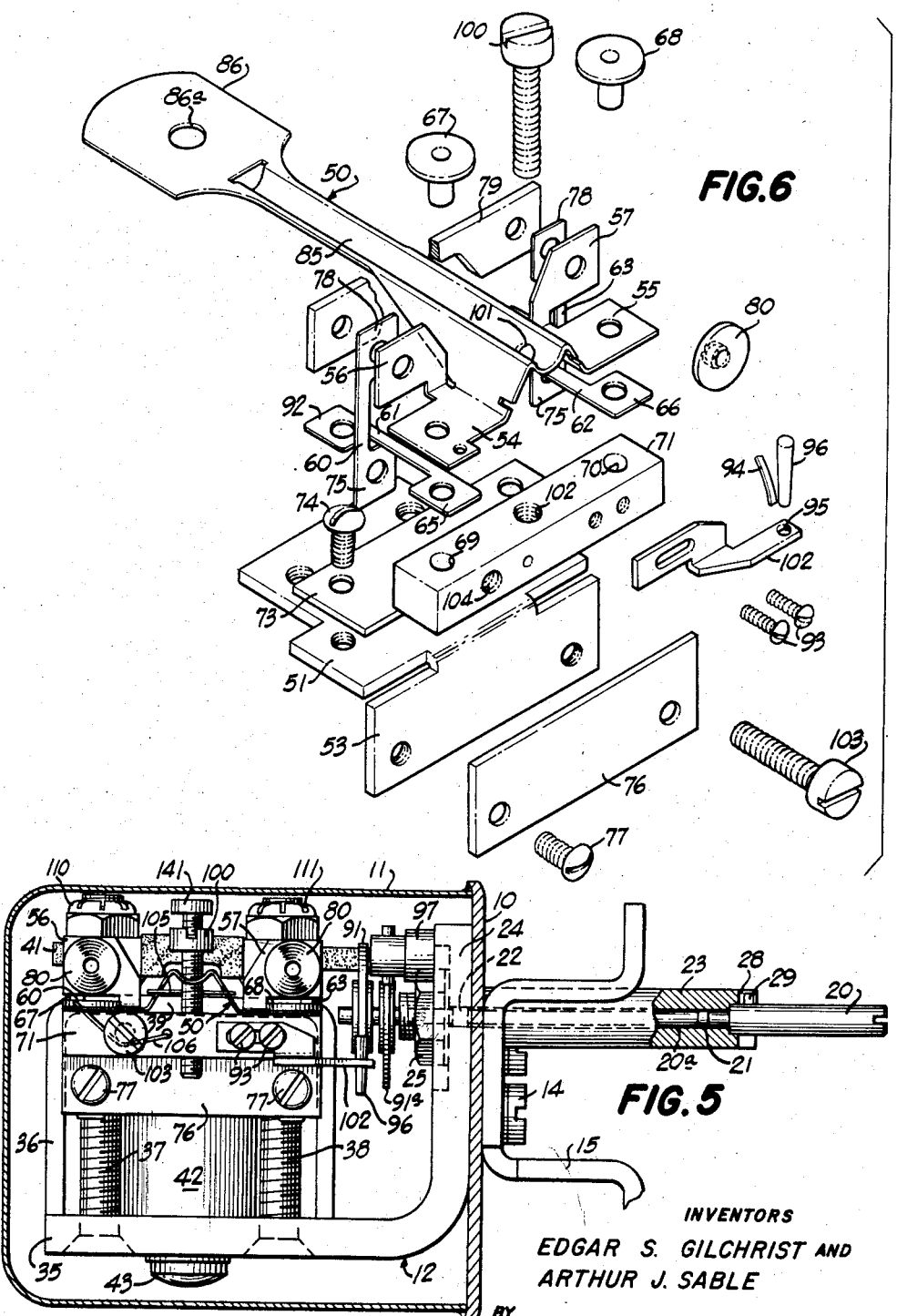

Nov. 17, 1959  E. S. GILCHRIST ET AL  2,913,672
ELECTROMECHANICAL BALANCE UNIT
Filed Oct. 17, 1956  4 Sheets-Sheet 4

INVENTORS
EDGAR S. GILCHRIST AND
ARTHUR J. SABLE
BY
Mason, Kolehmainen, Rathburn and Wyss.
ATTORNEYS United States Patent Office 2,913,672
Patented Nov. 17, 1959

2,913,672

ELECTROMECHANICAL BALANCE UNIT

Edgar S. Gilchrist, Easton, and Arthur Justin Sable, Milford, Conn., assignors to Manning, Maxwell & Moore, Inc., Stratford, Conn., a corporation of New Jersey Application October 17, 1956, Serial No. 616,485

8 Claims. (Cl. 331—65)

The present invention relates to an electromechanical balance unit, and, more particularly, to an electromechanical balance unit suitable for use in a transmitter unit capable of developing a direct current output signal in response to an input signal proportional to a measured variable, which input signal may be either mechanical or electrical, such transmitter unit being described in a copending application of Charles G. Roper and Edgar S. Gilchrist, Serial No. 389,564, filed November 2, 1953, which is assigned to the same assignee as the present invention.

It is an object of the present invention to provide a new and improved electromechanical balance unit which is compact and rugged in construction, has a high torque to inertia ratio, and can be manufactured at relatively low cost on a mass production basis.

It is another object of the present invention to provide a new and improved electromechanical balance unit wherein the feedback force exerted on the deflectable beam of the unit is linear throughout the range of movement of the beam.

It is a further object of the present invention to provide a new and improved electromechanical balance unit wherein a planar, printed circuit inductor cooperates with the deflectable beam of the unit in such manner as to produce a substantial increase in the sensitivity of the balance unit.

It is a still further object of the present invention to provide a new and improved electromechanical balance unit wherein improved mounting means for the deflectable beam of the unit are provided.

The invention, both as to its organization and method of operation, together with further objects and advantages thereof, will best be understood by reference to the following specification taken in connection with the accompanying drawing in which:

Fig. 3 is a sectional view taken along the line 3—3 of Fig. 2;

Fig. 4 is a sectional view taken along line 4—4 of Fig. 3;

Fig. 5 is a right hand elevational view of the balance unit as shown in Fig. 3;

Fig. 6 is an exploded view of the mounting arrangement for the deflectable beam of the unit of Fig. 1;

Fig. 7 is a sectional view taken along the line 7—7 of Fig. 4;

Fig. 8 is a sectional view taken along line 8—8 of Fig. 2;

Figures 1, 2:
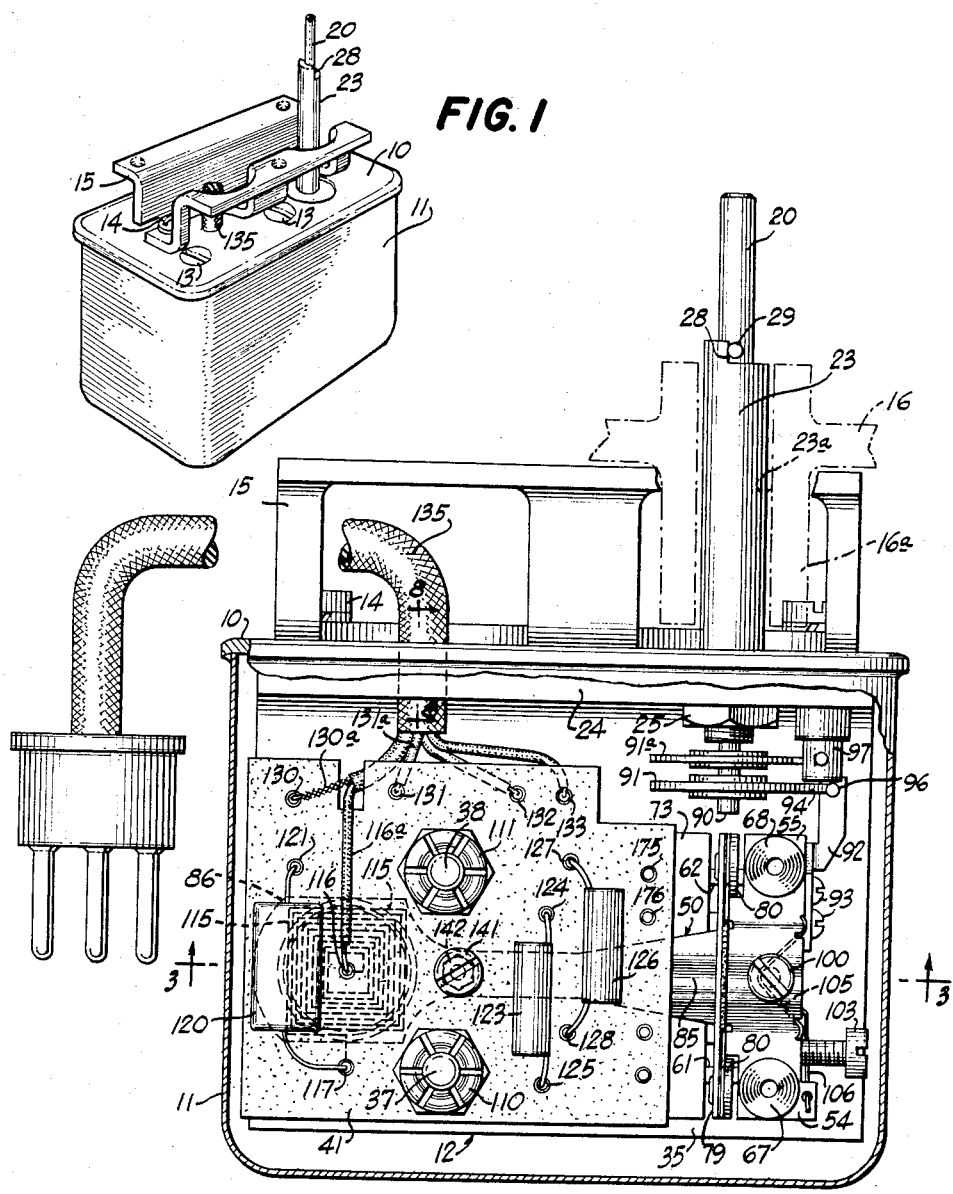
Fig. 1 is a perspective view of an electromechanical balance unit embodying the features of the present invention.
Fig. 2 is a plan view of the balance unit of Fig. 1 with the cover thereof broken away to show the structural details thereof.

The electromechanical balance unit of the present invention is adapted to be used in a transmitter unit such as shown and described in detail in a copending application of Charles G. Roper and Edgar S. Gilchrist, Serial No. 389,564, filed November 2, 1953, and reference may be had to this copending application for a detailed description of suitable transmitter units wherein the electromechanical balance unit of the present invention may be employed. Briefly considered, a transmitter of the type described in the above identified copending application, includes an electromechanical force balance unit and an associated oscillator, deflection of the beam of the balance unit in accordance with variations of any input variable being employed to vary the inductance of a planar inductor and this change in inductance being used to change the tuning of the oscillator. A portion of the output current of the oscillator is fed back to a feedback coil which is mounted on the beam and positioned in a magnetic field so that a force is exerted on the beam in opposition to the input force. In this connection it will be understood that deflection of the beam of the force balance unit may be produced in any desired manner in accordance with the variable to be measured insofar as the present invention is concerned.

Referring now to the drawings, the electromechanical balance unit of the present invention is therein illustrated as including an upper cover member 10, to which a lower cover member 11 may be secured as by soldering or the like to provide a totally enclosed unit, the base member 12 of the balance unit being secured to the upper cover member 10 by means of the screws 13 and the screws 14, which latter screws additionally secure a mounting bracket 15 to the upper cover member 10. In the event that the balance unit is positioned in an explosion-proof housing the bracket 15 would be mounted on a suitable partition, indicated in dotted lines at 16 in Fig. 2, within the explosion-proof housing (not shown).

The input shaft 20 of the balance unit is provided with the narrow lands 21 and 22 (Fig. 5) at either end thereof which support the shaft 20 within a bearing sleeve 23 which extends through and is secured to the upstanding wall 24 of the base member 12 by means of the nut 25. The bearing sleeve 23 is provided with a shoulder 28 which cooperates with a pin 29 secured to the input shaft 20 to prevent rotation of the input shaft 20 through more than 180 degrees and consequent damage to the deflectable beam of the balance unit. Since the pin 29 is visible externally of the housing 16 it provides a convenient indication of the position of the input shaft 20 as input force is applied to the beam. Preferably, the partition 16 of the external housing is provided with an enlarged boss 16a which encloses the sleeve 23 with only slight clearance therebetween so that a long, narrow flame path 23a is provided and flames due to an explosion in the chamber which includes the balance unit would not reach the exterior of the housing. In addition, a long, narrow flame path 20a (Fig. 5) is provided between shaft 20 and the sleeve 23 to provide a similar protection against flames within the balance unit itself.

In accordance with an important feature of the invention, the bottom flange 35 of the base member 12 supports the magnetic structure of the balance which, in turn, is employed to support the deflectable beam of the balance unit and the electrical circuit components associated therewith so that a rugged, compact structure is provided, wherein the parts may be readily assembled with a minimum number of mechanical tolerances and the input shaft accurately aligned with respect to the deflectable beam and this alignment maintained despite wide variations in ambient temperature and the attendant expansion and contraction of the metal parts of the balance unit. More particularly, a U-shaped member 36 is mounted on the bottom flange 35 by means of the screws 37 and 38, these screws extending upwardly through the top wall or bight portion 39 of the U-shaped member 36 and having the spacers 40 positioned thereon so as to support a printed circuit board 41 of insulating material in spaced position with respect to the top wall 39. A cylindrical core member 42 of magnetic material is secured to the bottom flange 35 by means of the bolt 43 which bolt extends upwardly through the core member 42 and into a cylindrical pole piece 44 so that the members 42 and 44 are held in assembled position on the bottom flange 35. The top wall 39 of the member 36 is provided with an opening 45 which cooperates with the pole piece 44 to form an annular air gap 132 (Fig. 10) within which a concentrated magnetic field is developed, it being understood that this magnetic circuit is completed through the walls of the U-shaped member 36 and the bottom flange 35 to the core piece 42.

In order to mount the deflectable beam 50 of the balance unit there is provided a bracket 51 which is secured to the top wall 39 by means of the screws 52 and is provided with a right angle flange portion 53. As best illustrated in Fig. 6, the beam 50 is provided with a pair of horizontal mounting flanges 54 and 55 and a pair of vertically extending mounting flanges 56 and 57. To support the beam 50 a first pair of resilient mounting elements 60 and 61 are connected to the flange portions 56 and 54 of the beam 50 and a second pair of resilient mounting elements 62 and 63 are connected to the flange portions 55 and 57 of the beam. The resilient elements 60, 61, 62 and 63 are each provided with enlarged end portions which are clamped to the corresponding flange portions of the beam 50 and the supporting bracket 51. More particularly, the forward end portions 65 and 66 of the mounting elements 61 and 62 are clamped between the underside of the mounting flanges 54 and 55 and a solid bar member 71 by means of the large headed rivets 67 and 68 which extend through corresponding apertures 69 and 70 in the member 71. The rear end portions 72 of the horizontal mounting elements 65 and 66 are clamped between the upper surface of the mounting bracket 51 and a flat clamping member 73 by means of the screws 74. The bottom end portions 75 of the vertical mounting elements 60 and 63 are clamped between the right angle flange portion 53 of the bracket 51 and a flat clamping member 76 by means of the screws 77 and the upper end portions 78 of the vertical mounting elements 60 and 63 are clamped between the mounting flanges 56 and 57 of the beam 50 and a flat clamping member 79 by means of the large headed rivets 80. It will be noted that the narrow central portions of the resilient mounting elements 60, 61, 62 and 63, are offset with respect to the center line of the end portions thereof and the end portions of each pair of elements are oppositely disposed so as to provide a compact crossed flexure mounting arrangement wherein the end portions of each pair of resilient elements are positioned in a common plane with respect to the axis of the beam 50. The intermediate portion of the beam 50 is provided with a trough-like portion 85 for increased rigidity of the beam and the beam 50 is provided with a flat, enlarged end portion 86 which acts as a planar control element of the balance. The inner end 90 of the input shaft 20 is connected through the calibrated input spring 91 to an extending arm 92 which is adjustably secured to the member 71 by means of the screws 93, the outer end 94 of the spring 91 being secured within an aperture 95 in the arm 92 by means of the drive pin 96. The inner end of a backlash spring 91a is connected to the shaft 90 and the outer end of the spring 91a is connected to a stud 97 mounted in the wall 24.

In order to balance the beam 50 statically, there is provided a large headed screw 100 which extends through a clearance opening 101 in the beam 50 and threads into an opening 102 in the member 71, a similar screw 103 being threaded into an aperture 104 in the member 71 to provide for adjustment of the static balance of the beam 50 in the other axis. After the screws 100 and 103 have been adjusted to attain static balance of the beam 50 these screws are held in place by means of the spring wire retainers 105 and 106 (Fig. 5) which engage the threads of the screws 100 and 103, respectively, and exert a side thrust thereon to lock the same in their adjusted positions. The bar 71, which is preferably of aluminum so as to have the same characteristics as the beam 50, acts as a counterweight to balance the weight of the end portion 86 of the beam 50. It will be noted that the bar 71 and screws 100 and 103 are all mounted very close to the pivotal axis of the beam 50 so that inertia effects, which vary in proportion to the square of the distance from the pivotal axis, are substantially reduced. Also, the beam 50 is also preferably made of aluminum to reduce the inertia effects thereof. On the other hand, the planar end portion 86 is positioned as far from the pivotal axis as possible while maintaining a compact structure so that a high torque to inertia ratio is achieved.

Considering now the details of the printed circuit board 41, it will be understood that this board is supported on the spacers 40 which surround the mounting screws 37 and 38 and the board 41 is securely held in spaced relation to the beam and the magnetic structure by means of the lock nuts 110 and 111 (Fig. 2). Preferably, a pair of annular metallic seats 112 are provided on the under surface of the board 41 so that the spacers 40 will not be pressed into the surface of the board 41 but instead will accurately position the bottom surface thereof with respect to the beam 50. The oscillator coil 115 is positioned on the bottom surface of the board 51 by any suitable printed circuit technique, the coil 115 being in the form of a flat, spiral wound, ribbon-like conductor, as will be described in more detail hereinafter in connection with Fig. 7. The inner end of the printed circuit coil 115 is connected to a central eyelet 116 and the outer end of the coil 115 is connected to an eyelet 117, the eyelets 116 and 117 extending through the board 41 so that connection can be made to the coil 115 from the top surface of the board 41. The planar element 86 of the beam 50 is provided with a central aperture 86a to provide clearance for the eyelet 116 and permit the element 86 to be moved relatively close to the oscillator coil 115. The upper surface of the board 41 also acts as a terminal board for the electrical components of the balance unit, a condenser 120 being positioned thereon and connected to the eyelets 121 and 117, a resistor 123 being connected to the eyelets 124 and 125 and a resistor 126 being connected to the eyelets 127 and 128. Suitable printed circuit connections are provided on the board 41 so that the components 120, 123 and 126 are connected in the manner shown in Fig. 9 to the eyelets 130, 131, 132 and 133 at the edge of the board 41 to which eyelets the conductors of a multiconductor cable 135 may be connected by any suitable means such as soldering or the like.

In accordance with an important feature of the present invention, the individual conductors 115a (Fig. 7) of the printed circuit oscillator coil 115 are in the form of flat, ribbon-like elements having a width many times greater than the thickness thereof so that the fields set up around the conductor elements 115a due to current flow therethrough are concentrated in a direction transversely of the board 41 with the result that the planar end portion 86 of the beam 50 can cause a greater influence on these fields and can be brought extremely close to the surface of the board 41 so as to produce a substantially increased change in inductance of the coil 115 for a given movement of the end portion 86 in a line perpendicular to the plane thereof. The beam 50 is made of aluminum and the planar end portion 86 acts as a shorted turn to produce a relatively large change in the inductance of the coil 115 for a given increment of movement of the beam 50. Also, the individual turns of the coil 115 are rectangular so that the area enclosed by each turn is a maximum and the coil has a maximum inductance per unit area. With this arrangement a planar control element of relatively small area, weight and inertia can be employed to obtain the desired change in inductance. Preferably, the exposed portions of the conductor elements 115a are gold plated so as to provide lower conductor resistance at the oscillator operating frequency of 30 megacycles. With such plating and a coil of the configuration described above a substantially higher Q is provided with the result that a substantially more sensitive balance unit is provided.

In order to limit downward movement of the end portion 86 of the beam 50 there is provided a stop pin 140 which is fixedly mounted in the upper wall 39 of the U-shaped member 36. Upward movement of the beam 50 is limited by means of an adjustable screw 141 which threads through a nut 142 secured to the printed circuit board 41 and extends through the board 41 to engage the trough 85 of the beam 50.

As shown in Fig. 8, the multiconductor cable 135 extends through the aligned apertures 145 and 146 in the members 10 and 24, respectively. In order to provide a moisture-proof seal around the cable 135, there is provided an annular recess 147 in the side of the member 24 facing the cover 10. A resilient washer 148 is positioned in the recess 147, the washer 148 being provided with an annular sloping shoulder 149 so that as the members 10 and 24 are clamped together by means of the screws 13 and 14 the washer 148 will be clamped between the members 10 and 24 under sufficient pressure to constrict the central opening 150 thereof about the cable 135 and effect a moisture-proof, strain relief seal between the cable 135 and the cover member 10, it being understood that the shoulder 147 assures that the washer 148 grips the cable 135 securely as it is compressed.

Figure 9:
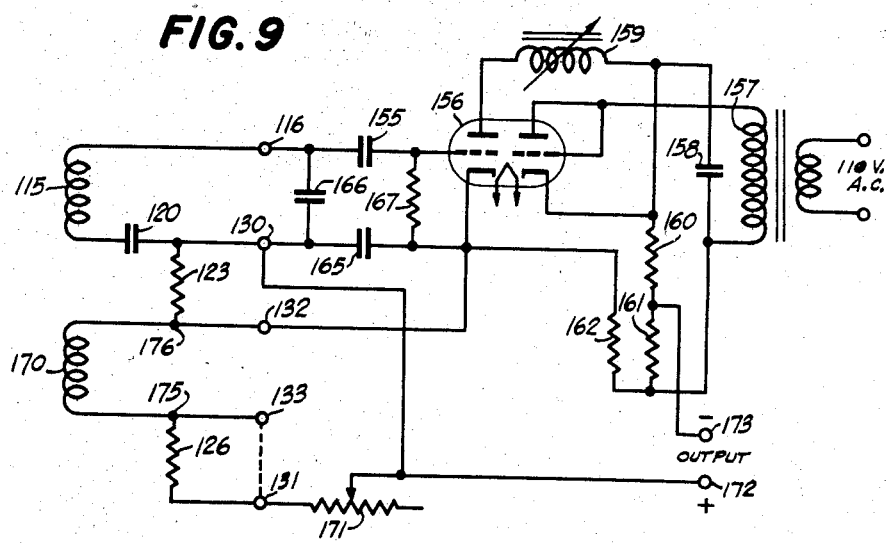
Fig. 9 is an electrical circuit diagram of the electromechanical balance unit of Fig. 1 and the associated transmitter circuitry.

Considering now the electrical circuitry of the complete transmitter unit shown in Fig. 9, the center terminal 116 of the oscillator coil 115 is connected by way of the conductor 116a of the cable 135 and through a condenser 155 to the control grid of a triode oscillator tube which forms the left hand section of a double triode tube 156. The right hand section of the tube 156 is used as a rectifier and the anode and control grid thereof are connected together and to one side of the power transformer secondary 157, the cathode of the right hand section of the tube 156 being connected to the filter condenser 158 so that a positive unidirectional voltage is produced across the condenser 158. The anode of the left hand section of the tube 156 is connected through the plate coil 159 to the positive B+ terminal and a pair of resistors 160 and 161, which form two arms of a bridge circuit, are connected between the positive and negative terminals of the B+ supply. The cathode of the left hand section of the tube 156 is connected to a resistor 162 which forms the third arm of the bridge, the anode-cathode space current path of the left hand section of the tube 156 forming the fourth arm of this bridge. The eyelet 130 on the printed circuit board 41 is connected by way of the conductor 138 of the cable 135 through a condenser 165 to the cathode of the left hand section of the tube 156, a tuning condenser 166 being connected across the series combination of the oscillator coil 115 and the condenser 120 to provide the necessary oscillator tank circuit. A grid leak resistor 167 is connected between the control grid and cathode of the left hand section of the tube 156.

In order to apply a force to the beam 50 in opposition to the torque exerted thereon through the input shaft 20, there is provided a feedback coil 170 which is supported on the underside of the planar end portion 86 of the beam 50 by means to be described in more detail hereinafter, the coil 170 being positioned within the annular air gap 182. One end of the feedback coil 170 is connected to the cathode of the oscillator tube and the other end of this coil is connected through the resistor 126, the conductor 131a of the cable 135 and a span potentiometer 171 to the positive output terminal 172, the negative output terminal 173 being connected to the junction point of the resistors 160 and 161. Accordingly, as the inductance of the oscillator coil 115 is varied in accordance with deflection of the beam 50, the above described bridge circuit becomes unbalanced and current flows through the load connected to the output terminals 173 and 172, the span resistor 171, the resistor 126 and the oscillator coil 170 so as to apply a force to the beam 50 in opposition to the input signal, as described in more detail in the above identified copending application. It will be noted that the resistor 123 is connected in parallel with the series combination of the feedback coil 170, the resistor 126 and the potentiometer 171. The resistor 123 shunts a portion of the output current around the oscillator coil 170 and the values of the resistances in the feedback circuit may be so chosen as to provide the desired feedback current flow through the coil 170. Both the resistors 123 and 126 are copper temperature compensating resistors and are mounted within the electromechanical balance unit itself so that they will be subjected to the same temperature as the magnet 42 and the calibrated input spring 91. The temperature coefficients of the resistors 123 and 126 are so chosen that compensation is provided for both the weakening of the spring 91 and the change in the magnetic characteristics of the magnet 42 with increasing temperature. In some instances a different range of input torque is required, in which case a jumper may be connected between the eyelets 131 and 133 so as to cut out the resistor 126 and increase the current flow through the feedback coil 170. The ends of the feedback coil 170 are connected by means of flexible lead wires to the eyelets 175 and 176 on the printed circuit board 41 so that the coil 170 is connected into the circuit in the manner shown in Fig. 9 through the printed circuit conductors on the board 41.

Considering now the manner in which the feedback coil 170 is mounted on the beam 50, the coil 170 is wound on a coil form 180 (Fig. 10), the coil form 180 being in the form of a thin sleeve of aluminum which is cemented to a spacer 181 of insulating material, the spacer 181 being cemented to the bottom surface of the planar end portion 86 of the beam 50. The coil form 180 is made of aluminum so that it acts as a shorted turn and since the coil form 180 is positioned within the air gap 182 a damping action is provided by the coil form 180 while, at the same time, providing a support for the feedback coil 170. The damping action provided by the aluminum coil form 180 provides increased stability for the transmitter unit and permits the use of higher gain and sensitivity therein.

Figure 10:
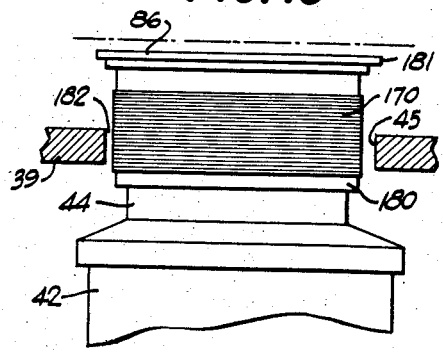
Figs. 10 and 11 are fragmentary sectional views taken along the line 10—10 of Fig. 3 and showing the feedback coil of the unit of Fig. 1 in the two extreme positions of the deflectable beam of the balance unit.
Figure 11:
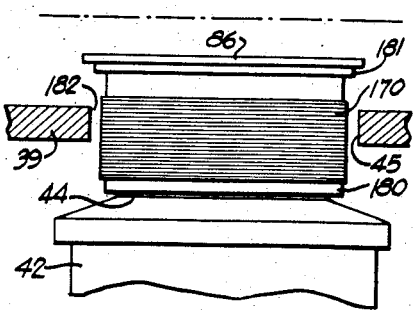

In accordance with an important feature of the invention, the feedback coil 170 is wound so that it has a length substantially greater than the depth of the air gap 182 (Figs. 10 and 11). Accordingly, throughout the range of movement of the beam 50 between the limiting positions established by the stops 140 and 141, substantially the same number of turns of the feedback coil 170 are positioned within the air gap 182 so that the force applied to the beam 50 by virtue of current flow through the coil 170 is linearly related to the feedback current over the entire range of the instrument.

While there has been illustrated and described what is considered to be the preferred embodiment of the invention, it will be understood that various modifications may be made therein which are within the true spirit and scope of the invention as defined in the appended claims.

What is claimed as new and is desired to be secured by Letters Patent of the United States is:

1. An electromechanical force balance unit, comprising a base member, a U-shaped member positioned on said base member and having an opening in the bight portion thereof, a cylindrical pole piece supported on said base member and extending through said opening to define an annular air gap therebetween, a pivotally mounted beam supported on said base member a planar control element on said beam, a planar control inductor positioned in a plane substantially parallel to said planar control element and spaced therefrom, movement of said control element in a line perpendicular to the plane of said inductor varying the inductance of said control inductor, means limiting movement of said control element along said line in both directions, a coil form supported on one end of said beam and positioned around said pole piece within said air gap, and a coil wound on said coil form and positioned in said air gap, said coil having a length substantially greater than the depth of said air gap so that substantially the same number of turns of said coil are positioned within said air gap throughout the range of movement of said control element.

2. In an electromechanical system for measuring a variable, the combination including a displaceable member having a control element provided with a planar control surface and displaceable in an amount proportional to a measured variable, magnetic circuit means defining a magnetic field within an annular air gap, a planar control inductor positioned in a plane substantially parallel to said planar control surface and spaced therefrom, electrical means connected to said control inductor for developing an output current, movement of said control element in a line perpendicular to the plane of said inductor varying said output current, means limiting movement of said control element along said line in both directions, a coil form on said displaceable member and positioned in said air gap, a coil wound on said coil form, means for energizing said coil in proportion to said output current, thereby to apply a force to said member in opposition to the displacement of said member, said coil having a length substantially greater than the depth of said air gap so that substantially the same number of turns of said coil are positioned within said air gap throughout the range of movement of said control element and said opposition force is linearly related to said output current, and a work circuit energized by said output current.

3. In an electromechanical system for measuring a variable, the combination including a displaceable member having a control element provided with a planar control surface and displaceable in an amount proportional to a measured variable, magnetic circuit means defining a magnetic field within an annular air gap, a control inductor comprising a flat, spiral wound, ribbon-like conductor positioned in a plane substantially parallel to said planar control surface and spaced therefrom, electrical means connected to said control inductor for developing an output current, movement of said control surface in a line perpendicular to the plane of said inductor varying said output current, means limiting movement of said control surface along said line in both directions, a coil form on said displaceable member and positioned in said air gap, a coil wound on said coil form, means for energizing said coil in proportion to said output current, thereby to apply a force to said member in opposition to the displacement of said member, said coil having a length substantially greater than the depth of said air gap so that substantially the same number of turns of said coil are positioned within said air gap throughout the range of movement of said control surface and said opposition force is linearly related to said output current, and a work circuit energized by said output current.

4. An electromechanical force balance unit, comprising a base member, a U-shaped member positioned on said base member and having an opening in the bight portion thereof, a cylindrical pole piece supported on said base member and extending through said opening to define an annular air gap therebetween, a printed circuit board of insulating material supported on said U-shaped member and spaced from the bight portion thereof, a pivotally mounted metallic beam extending between said printed circuit board and the bight portion of said U-shaped member, a printed circuit inductor positioned on the surface of said board adjacent said beam, individual turns of said inductor having a width many times greater than the thickness thereof, the portion of said beam adjacent said printed circuit inductor acting as a planar control element to vary the inductance of said printed circuit inductor upon movement of said beam in a line perpendicular to the plane of said inductor, a coil form secured to said portion of said beam and positioned around said pole piece within said air gap, and a coil wound on said coil form and positioned in said air gap.

5. An electromechanical force balance unit, comprising a base member, a U-shaped member positioned on said base member and having an opening in the bight portion thereof, a cylindrical pole piece supported on said base member and extending through said opening to define an annular air gap therebetween, a printed circuit board of insulating material supported on said U-shaped member and spaced from the bight portion thereof, a pivotally mounted metallic beam extending between said printed circuit board and the bight portion of said U-shaped member, a printed circuit inductor positioned on the surface of said board adjacent said beam, individual turns of said inductor having a width many times greater than the thickness thereof, the portion of said beam adjacent said printed circuit inductor acting as a planar control element to vary the inductance of said printed circuit inductor upon movement of said beam in a line perpendicular to the plane of said inductor, a coil form secured to said portion of said beam and positioned around said pole piece within said air gap, a coil wound on said coil form and positioned in said air gap, and means limiting movement of said beam along said line in both directions, said coil having a length substantially greater than the depth of said air gap so that substantially the same number of turns of said coil are positioned within said air gap throughout the range of movement of said beam.

6. In an electromechanical force balance unit, the combination of, a base member, a U-shaped member positioned on said base member and having an opening in the bight portion thereon, a cylindrical pole piece supported on said base member and extending through said opening to define an annular air gap therebetween, a right angle bracket mounted on said bight portion, a metallic beam, means including a plurality of pairs of resilient mounting elements for supporting said beam from spaced points on said right angle bracket, each of said resilient mounting elements having enlarged end portions secured to said beam and said bracket and each pair of said elements having a narrow central support portion offset with respect to the center line of said end portions, one end of said beam extending over said annular air gap, a coil secured to said one end of said beam and positioned within said air gap, and a planar inductor positioned above said one end of said beam in a plane substantially parallel thereto.

7. In an electromechanical force balance unit, the combination of, a base member, a U-shaped member positioned on said base member and having an opening in the bight portion thereon, a cylindrical pole piece supported on said base member and extending through said opening to define an annular air gap therebetween, a right angle bracket mounted on said bight portion, a metallic beam, means including a plurality of pairs of resilient mounting elements for supporting said beam from spaced points on said right angle bracket, each of said resilient mounting elements having enlarged end portions secured to said beam and said bracket and each pair of said elements having a narrow central support portion offset with respect to the center line of said end portions, a printed circuit board of insulating material supported on said U-shaped member and spaced from the bight portion thereof, one end of said beam extending between said printed circuit board and the bight portion of said U-shaped member, a printed circuit inductor positioned on the under surface of said board adjacent said one end of said beam, individual turns of said inductor having a width many times greater than the thickness thereof, and a coil secured to said one end of said beam and positioned within said air gap.

8. In an electromechanical force balance unit, the combination of, a base member, a U-shaped member positioned on said base member and having an opening in the bight portion thereof, a cylindrical pole piece supported on said base member and extending through said opening to define an annular air gap therebetween, a right angle bracket mounted on said bight portion, a metallic beam, means including a plurality of pairs of resilient mounting elements for supporting said beam from spaced points on said right angle bracket, each of said resilient mounting elements having enlarged end portions secured to said beam and said bracket and each pair of said elements having a narrow central support portion offset with respect to the center line of said end portions, a printed circuit board of insulating material supported on said U-shaped member and spaced from the bight portion thereof, one end of said beam extending between said printed circuit board and the bight portion of said U-shaped member, a printed circuit inductor positioned on the under surface of said board adjacent said one end of said beam, individual turns of said inductor having a width many times greater than the thickness thereof, a coil secured to said one end of said beam and positioned within said air gap, a cover member secured to said base member, a multiconductor cable connected to said printed circuit inductor and extending through aligned apertures in said base member and said cover member, and a resilient washer positioned within an annular recess in said member adjacent said aligned apertures, said washer being clamped between said base member and said cover member under sufficient pressure to constrict the central opening thereof about said cable and effect a moisture-proof seal between said cable and said cover member.

References Cited in the file of this patent

UNITED STATES PATENTS

| | | |
|---|---|---|
| 2,583,854 | Kehbel | Jan. 29, 1952 |
| 2,614,163 | Roper | Oct. 14, 1952 |
| 2,622,238 | Boltson | Dec. 16, 1952 |

FOREIGN PATENTS

| | | |
|---|---|---|
| 677,295 | Great Britain | Aug. 13, 1952 |